United States Patent
Good et al.

(10) Patent No.: US 11,649,574 B2
(45) Date of Patent: *May 16, 2023

(54) THERMOPLASTIC COMPOSITES WITH IMPROVED THERMAL AND MECHANICAL PROPERTIES

(71) Applicant: HANWHA AZDEL, INC., Forest, VA (US)

(72) Inventors: Brian Timothy Good, Forest, VA (US); Jesse Guy Hipwell, Grand Blanc, MI (US); Coray Harper, Baton Rouge, LA (US); Thomas A Ebeling, Forest, VA (US)

(73) Assignee: Hanwha Azdel, Inc., Forest, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/786,070

(22) Filed: Feb. 10, 2020

(65) Prior Publication Data

US 2020/0385905 A1      Dec. 10, 2020

Related U.S. Application Data

(63) Continuation of application No. 15/171,785, filed on Jun. 2, 2016, now Pat. No. 10,557,224, which is a
(Continued)

(51) Int. Cl.
*D04H 1/552* (2012.01)
*B32B 17/04* (2006.01)
(Continued)

(52) U.S. Cl.
CPC .............. *D04H 1/552* (2013.01); *B32B 17/04* (2013.01); *B32B 19/02* (2013.01); *D06B 1/00* (2013.01);
(Continued)

(58) Field of Classification Search
CPC ........ D04H 1/552; B32B 17/04; B32B 19/02; D06B 1/00; Y10T 428/249946; Y10T 428/24992
See application file for complete search history.

(56) References Cited

U.S. PATENT DOCUMENTS 4,882,114 A * 11/1989 Radvan .................. B29C 35/04
264/129
10,557,224 B2 * 2/2020 Good ....................... D06B 1/00
(Continued)

*Primary Examiner* — Jeremy R Pierce
(74) *Attorney, Agent, or Firm* — Rhodes IP PLC; Christopher R Rhodes

(57) ABSTRACT

A moldable composite sheet having improved thermal and mechanical property characteristics. In one aspect, the composite sheet may be a porous fiber-reinforced thermoplastic resin comprising discontinuous mineral reinforcing fibers, and one or more skin layer materials. Generally, the composite sheet may have a void content or porosity from about 5% to about 95% by volume of the sheet, an areal weight between about 400 g/m² to about 4000 g/m² (gsm), a mineral fiber content from about 20% to about 80% by weight, and a thermoplastic resin content from about 20% to about 80% by weight of the composite sheet. The composite sheet can be molded via low pressure processes, such as thermoforming, match metal molding on stops, vacuum forming and pressure forming, to produce durable automotive interior trim parts and construction articles having improved thermal and mechanical properties in addition to other beneficial characteristics.

17 Claims, 1 Drawing Sheet

Flexural Properties of Basalt-Filled and Comparative Glass-Filled Composites

Related U.S. Application Data continuation of application No. 11/893,613, filed on Aug. 15, 2007, now abandoned.

(60) Provisional application No. 60/838,047, filed on Aug. 15, 2006.

(51) Int. Cl.
*B32B 19/02* (2006.01)
*D06B 1/00* (2006.01)

(52) U.S. Cl.
CPC .................. *Y10T 428/24992* (2015.01); *Y10T 428/249946* (2015.04)

(56) References Cited

U.S. PATENT DOCUMENTS

| | | | | |
|---|---|---|---|---|
| 2002/0006755 | A1* | 1/2002 | North | B60R 13/0225 442/50 |
| 2003/0127842 | A1* | 7/2003 | Pywell | B60R 21/08 280/753 |
| 2004/0018789 | A1* | 1/2004 | Marchbanks | B29C 45/14811 442/221 |
| 2004/0235377 | A1* | 11/2004 | Byma | B32B 5/02 442/43 |
| 2005/0161865 | A1* | 7/2005 | Bristow | B29C 51/145 264/511 |

* cited by examiner

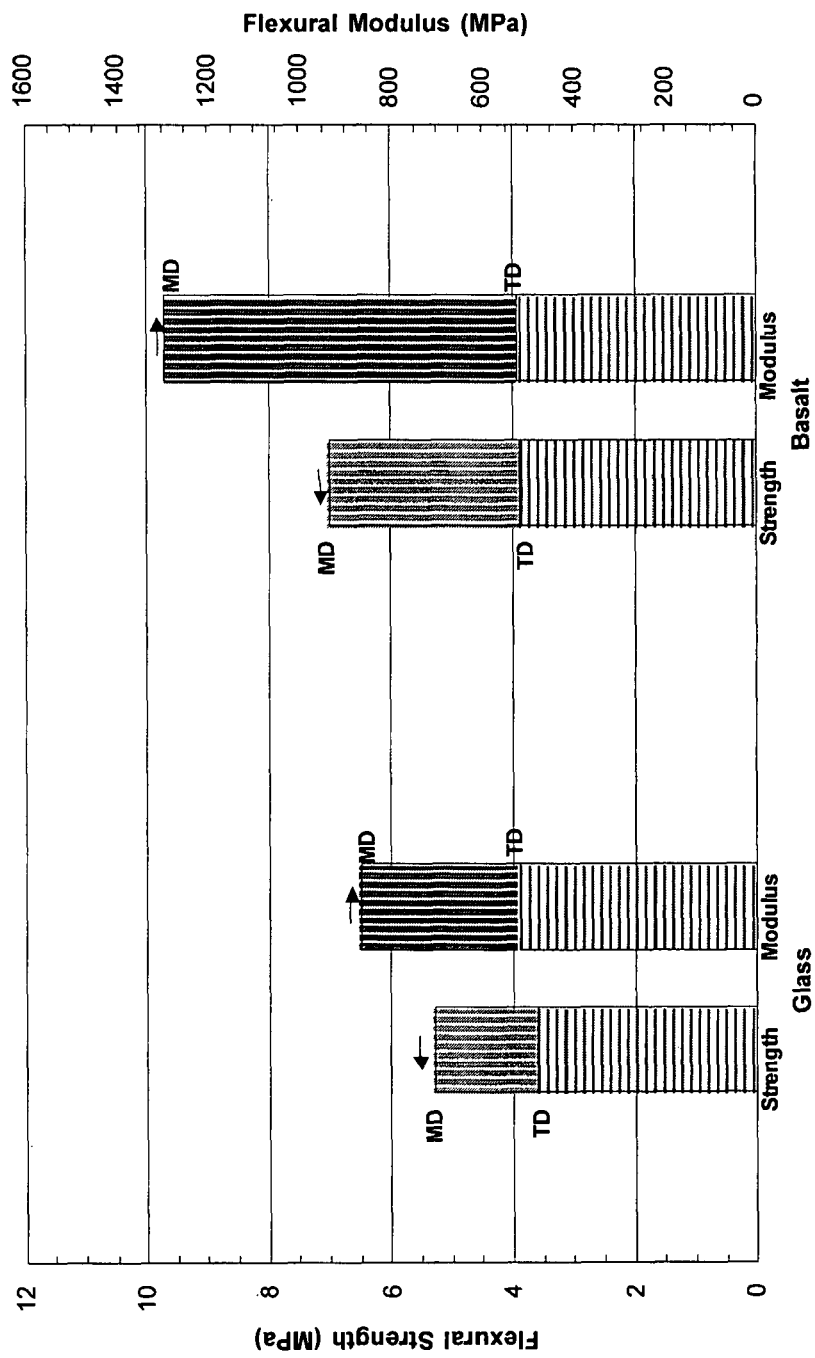

THERMOPLASTIC COMPOSITES WITH IMPROVED THERMAL AND MECHANICAL PROPERTIES

CROSS REFERENCE TO RELATED APPLICATIONS

This application is a continuation application of U.S. Ser. No. 15/171,785 filed on Jun. 2, 2016, which issued as U.S. Pat. No. 10,557,224 on Feb. 11, 2020. U.S. Ser. No. 15/171,785 is a continuation application of U.S. Ser. No. 11/893,613, filed on Aug. 15, 2007 and now abandoned, which claims priority under 35 U.S.C. 119(e)(1) to U.S. Provisional Application No. 60/838,047, filed Aug. 15, 2005, which is hereby incorporated by reference in its entirety.

FIELD OF THE INVENTION

This invention relates generally to moldable composite materials, the use of such materials to form moldable articles, and to improvements in certain characteristics, such as the thermal and mechanical properties, of such materials and articles formed therefrom. Specifically, the invention relates to fiber-reinforced composite materials having a beneficial combination of characteristics wherein the composite material exhibits improved properties, such as strength, heat insulative characteristics, rigidity and flexural properties. Although not limited thereto, the invention is useful in the manufacture of automotive articles, such as headliners, door modules, instrument panel toppers, front and/or rear pillar trims, sunshades, parcel shelves, and package trays, and in construction articles, such as ceiling and acoustic panels, in which the improved characteristics provide advantages over other materials utilized for such applications.

BACKGROUND OF THE INVENTION

Driven by a growing demand by industry, governmental regulatory agencies and consumers for durable and inexpensive products that are functionally comparable or superior to metal products, a continuing need exists for improvements in composite articles subjected to difficult service conditions. This is particularly true in the automotive industry where developers and manufacturers of articles for automotive and construction materials applications must meet a number of competing and stringent performance specifications for such articles.

In an effort to address these demands, a number of composite materials have been developed, including glass mat thermoplastic (GMT) composites. Such composites provide a number of advantages, e.g., they can be molded and formed into a variety of suitable products both structural and non-structural, including, among many others, automotive bumpers, interior headliners, and interior and exterior trim parts. Traditional GMT composites used in exterior structural applications are generally compression flow molded and are substantially void free in their final part shape. By comparison, low density GMT composites used in automotive interior applications are generally semi-structural in nature and are porous and light weight with densities ranging from 0.1 to 1.8 g/cm$^3$ and containing 5% to 95% voids distributed uniformly through the thickness of the finished part. The stringent requirements for certain automotive interior applications have been difficult to meet, however, for existing GMT products, particularly where such applications require a desirable combination of properties, such as light weight, good rigidity and good strength characteristics. As a result, a continuing need exists to provide further improvements in the ability of composite materials, including sheet materials, to meet such performance standards.

SUMMARY OF THE INVENTION

The present invention is addressed to the aforementioned need in the art, and provides a novel composite material having improved thermal and mechanical characteristics. For example, in one aspect, the composite material is sheet form material that exhibits improved rigidity/sag resistance and flexural properties when mineral fibers, such as basalt fibers, are incorporated in the core of the composite sheet material as compared to glass-filled composite sheet materials. Articles formed from the composite material of the invention may exhibit improved thermal stability and strength characteristics thereby allowing for the manufacture of new articles requiring such characteristics, particularly in automotive interior applications.

Generally, the moldable composite sheet material comprises a thermoplastic resin, discontinuous mineral fibers dispersed within the thermoplastic resin, and one or more skin layers on the surface of the mineral fiber-containing thermoplastic resin. In one aspect, the moldable composite sheet material exhibits rigidity/sag resistance and flexural characteristics relative to a comparative composite sheet material differing from the moldable composite sheet material only in that the thermoplastic resin core material of the comparative composite sheet material contains a glass-fiber component rather than a mineral fiber component. In this regard, the invention is partly attributable to the discovery that beneficial improvements in rigidity/sag resistance and flexural properties of composite articles may be obtained by incorporating mineral fibers, such as basalt fibers, in the moldable composite sheet material.

BRIEF DESCRIPTION OF THE DRAWINGS

FIG. 1 depicts experimental flexural properties obtained as described in Example 3 and comparative Example 3C.

DETAILED DESCRIPTION OF THE INVENTION

As used in the specification and the appended claims, the singular forms "a," "an," and "the" include plural referents unless the context clearly dictates otherwise. Thus, for example, reference to "a thermoplastic resin" encompasses a combination or mixture of different resins as well as a single resin, reference to "a skin layer" or "a surface layer" includes a single layer as well as two or more layers that may or may not be the same and may be on one or more sides or surfaces of a sheet material, and the like.

As used herein, the term "about" is intended to permit some variation in the precise numerical values or ranges specified. While the amount of the variation may depend on the particular parameter, as used herein, the percentage of the variation is typically no more than 5%, more particularly 3%, and still more particularly 1% of the numerical values or ranges specified. When used to modify particular numerical values or ranges, the phrases "greater than about" or "less than about" refer to amounts or ranges that are respectively greater than or less than the amounts or ranges encompassed by the term "about".

In this specification and in the claims that follow, reference is also made to a certain terms, which shall be defined to have the following meanings:

The term "basis weight" generally refers to the areal density of a fiber reinforced thermoplastic material, typically expressed in grams per square meter (g/m2 or gsm) of the material in sheet form. The term "reduced basis weight" refers to a reduction in the basis weight that may be realized for materials according to the invention relative to a comparative material. As used herein, the "comparative glass fiber reinforced thermoplastic sheet material" differs from the inventive material at least in one characteristic of the thermoplastic sheet material, such as sheet thickness or the type or characteristics of the fibers.

The term "fabric" as used herein denotes a two- or possibly three-dimensional product built up from oriented fibers. These fibers may occur in the fabric uni-directionally (uni-directional thread as warp with an occasional woof thread), bi-directionally with different warp and woof ratios, or tri-directionally. The term "mat" generally refers to random filaments of fibers of relatively short length pressed into a sheet.

As used herein, the phrases "improved rigidity" and "improved sag resistance" are intended to include any improvement that is associated with the rigidity and/or sag resistance of a composite sheet material of the invention. Such improvements include, without limitation, increased sag resistance of the composite sheet material, e.g., as measured according to the sag resistance measurements described in the Examples herein, as well as other sag resistance characteristics or measurement techniques. The terms "improved rigidity" and "improved sag resistance" are not intended to be limited according to a particular measurement technique. However, sag resistance characteristics for inventive and comparative materials are typically evaluated by making and testing the materials under the same conditions (e.g., sag resistance measurements for inventive and comparative materials are typically conducted by exposure of the materials to the same temperature and for the same amount of time).

The moldable composite sheet material of the invention includes a thermoplastic resin, discontinuous mineral fibers dispersed within the thermoplastic resin, and one or more skin layers on the surface of the fiber-containing thermoplastic resin.

The thermoplastic resin may generally be any thermoplastic resin having a melt temperature below the resin degradation temperature. Non-limiting examples of such resins include polyolefins such as polyethylene and polypropylene, thermoplastic polyolefin blends, polyesters, polycarbonates, polystyrenes, and copolymers or mixtures thereof. Other suitable thermoplastic resins will be apparent to the skilled artisan.

Mineral fibers suitable for use in the invention generally include, without limitation, any mineral fiber that provides the advantages demonstrated herein. Such fibers include, without limitation, basalt, mineral wool (e.g., rock or slag wool), wollastonite, alumina silica, and the like, or mixtures thereof. As demonstrated in the Examples provided herein, basalt fibers, for example, provide certain advantages in rigidity/sag resistance and flexural properties compared with glass-filled composite sheet materials. Typically, the fiber content is from about 20% to about 80% by weight of the thermoplastic resin. Mineral fibers suitable for use herein are further described in the patent literature (as noted below), and typically have dimensions in the range of about 7 mm to about 50 mm in length with the diameter not less than about 7 microns.

Other fibers may also be incorporated in the composite sheet materials of the invention if desired, including: glass fibers, carbon fibers, synthetic organic fibers, particularly high modulus organic fibers such as para- and meta-aramid fibers, natural fibers such as hemp and sisal, or mixtures thereof. As noted above, suitable fiber contents range from about 20% to about 80% by weight of the thermoplastic resin. Such other fibers suitable for use herein are also further described in the patent literature (as noted below), and typically have dimensions similar to the mineral fibers described above.

As the thermoplastic resin containing dispersed mineral fibers, the moldable composite sheet of the invention may, according to one embodiment, be a low density thermoplastic composite prepared according to a wet-lay papermaking technique utilizing mineral fibers rather than glass fibers. One such glass fiber-containing mat is prepared by AZDEL, Inc. utilizing glass fibers rather than mineral fibers and is sold under the trademark SUPERLITE® mat. Typically, the areal density of such a glass mat thermoplastic (GMT) is from about 400 grams per square meter of the GMT (g/m$^2$) to about 4000 g/m$^2$, although the areal density may be less than 400 g/m$^2$ or greater than 4000 g/m$^2$ depending on the specific application needs.

The mineral fiber-containing mat may be prepared using chopped mineral fibers, a thermoplastic resin binder and a thermoplastic polymer film or films and/or woven or non-woven fabrics made with glass fibers or thermoplastic resin fibers such as polypropylene (PP), polybutylene terephthalate (PBT), polyethylene terephthalate (PET), polycarbonate (PC), a blend of PC/PBT, or a blend of PC/PET. Generally, PP, PBT, PET, and PC/PET and PC/PBT blends are the preferred thermoplastic resins. To produce the low density composite sheet, the materials and other additives are metered into a dispersing foam contained in an open top mixing tank fitted with an impeller. The foam aides in dispersing the mineral fibers and thermoplastic resin binder. The dispersed mixture of fibers and thermoplastics resin is pumped to a head-box located above a wire section of a paper machine via a distribution manifold. The foam, not the mineral fiber or thermoplastic resin, is then removed as the dispersed mixture passes through a moving wire screen using a vacuum, continuously producing a uniform, fibrous wet web. The wet web is passed through a dryer to reduce moisture content and to melt the thermoplastic resin binder. When the hot web comes out of the dryer, a multi-layer thermoplastic film is laminated into the web by passing the web of mineral fiber, thermoplastic resin and thermoplastic polymer film or films through the nip of a set of heated rollers. A non-woven and or woven fabric layer may also be attached along with or in place of the multi-layer thermoplastic film to one side or to both sides of the web to facilitate ease of handling the mineral fiber-reinforced mat. The composite sheet is then passed through tension rolls and continuously cut (guillotined) into the desired size for later forming into an end product article. Further information concerning the preparation of composites, including suitable materials and fibers used in forming such composites that may also be utilized in the present invention, may be found in a number of U.S. patents, e.g., U.S. Pat. Nos. 6,923,494, 4,978,489, 4,944,843, 4,964,935, 4,734,321, 5,053,449, 4,925,615, 5,609,966 and U.S. Patent Application Publication Nos. US 2005/0082881, US 2005/0228108, US 2005/0217932, US 2005/0215698, US 2005/0164023, and US 2005/0161865.

Natural (e.g., hemp, sisal) and/or synthetic fibers such as glass fibers, carbon fibers, organic fibers such as para- and meta-polyaramids, polyesters such as polyethylene terephthate fibers, and mixtures of fibers may also be used for the production (as described above) of such a mat for use in the composite sheet of the invention. Also, various amorphous or crystalline thermoplastic resins may be employed, such as polyesters (PET, PBT, PPT), acrylics, HDPE, polyethylene (PET), polypropylene (PP), polycarbonate (PC) or blends of PC/PBT or PC/PET and the like thermoplastic polymers without modification of the web forming process. The ratio of fibers to polymers, as well as the basic weight of the web, can be easily varied in order to meet the particular requirements of cost and material performance of a specific application.

Additional information concerning suitable thermoplastic resins and fibers, as well as details concerning wet-laid manufacturing methods useful in the present invention, may be found in patents assigned to K-Plasheet (e.g., U.S. Pat. Nos. 5,981,046 and 6,756,099).

The present invention may further include additional components. For example, an "expandable" polymeric bead component that typically expands due to the application of heat may be added as described in Provisional Application Ser. No. 60/801,640. Among such materials, microspheres (e.g., hollow microballoons or microbubbles) find prevalent use in industry, most commonly as additives or fillers. One benefit of microspheres over fillers (e.g., silicates, aluminates, clays, talcs, and the like) is that the hollow feature of the microsphere results in weight reduction. Microspheres also provide a means of introducing controlled, small voids in a closed-cell configuration. This can be difficult to obtain in both viscous and non-viscous fluids, resins, coatings, and cements using conventional foaming agents due to problems associated with the foaming process such as unequal cell growth, time- and temperature-dependent gas diffusion, cell coalescence, and the like. Thus, microspheres provide a means for uniformly and homogeneously increasing product bulk or loft of a composite sheet while simultaneously decreasing the overall density, lowering product cost on a volumetric basis without sacrificing (or while enhancing) performance.

In addition to the benefits of reduced weight and product cost, microspheres offer many other advantages in a wide variety of applications. For example, an overall increased volume load capacity (i.e., higher loading capacities) in turn provides dimensional stability, improved range of application, and further overall weight or density reduction.

Microspheres useful in the present invention may be particles of thermoplastic resin material and may have incorporated therein a chemical (e.g., hydrocarbon) or physical blowing agent, and which may be expanded upon heating. The microspheres useful in the invention may generally have any desired diameter; e.g., they may have an average diameter of from about 5 to about 150 µm. Typically, the average diameter is about 10 to about 16 µm in an unexpanded state, and, in an expanded state, a diameter of about 15 to about 90 µm, typically about 40 to about 60 µm. The microspheres may be used in either an expanded or unexpanded state, or blends of both when utilized in the invention. Any suitable thermoplastic resin material may be used to make up the microspheres, including, for example, polystyrene, styrene copolymers, acrylonitrile polymers, polyvinyl chloride, vinyl chloride copolymers, vinylidene chloride copolymers, polyimide polymers, and the like. The thermoplastic synthetic resin material is typically solid at room temperature.

Suitable microspheres may also include those made from inorganic materials such as glass and silica-alumina ceramics or polymeric materials such as epoxy resin, unsaturated polyester resin, silicone resin, phenolics, polyvinyl alcohol, polyvinyl chloride, polypropylene, and polystyrene. In addition, fly ash that is in the form of hollow particles can be used. Examples of commercially available fly ash of this type are sold by Boliden Intertrade, Inc., under the trade names Fillite 100 and Fillite 150. The microspheres advantageously have a burst pressure sufficient to withstand the forces imposed upon them during the formulation, mixing and dispensing processes. Microspheres having an 80% or greater survival rate when exposed to at least 750 psi are preferred, and those having an 80% or greater survival rate when exposed up to 5500 psi are more preferred. In addition, the microspheres typically have a low bulk density of from about 0.1 to about 0.5 g/cc.

The microspheres may include a chemical or physical blowing agent within the sphere that permits them to be expanded upon heating. Any suitable blowing agent may be used provided that it causes the microspheres to expand upon heating. For example, suitable blowing agerits may include azodicarbonamide, isobutane, pentane, isopentane, $CO_2$, and/or freon. If desired, the microspheres may be surface treated with an interfacial adhesion promoter such as a silane compound.

An "expandable polymeric microsphere" is a microsphere that includes a polymer shell and a core material in the form of a gas, liquid, or combination thereof, which expands upon heating. Expansion of the core material, in turn, causes the shell to expand, at least at the heating temperature. An expandable microsphere is one where the shell can be initially expanded or further expanded without breaking. Some microspheres may have polymer shells that only allow the core material to expand at or near the heating temperature. In one aspect, the expandable microsphere does not include a binding agent (e.g., a binder phase) found in most syntactic foam preparations. For example, a binderless expandable microsphere includes microspheres that are capable of increasing in size upon heating due to the formation of one or more gaseous voids or bubbles in the interior of the particle to give a microbubble or microballoon. Such microspheres typically comprise a hollow particle defined by having a polymeric shell wall surrounding one or more internal, gaseous voids. The lack of a binder agent reduces costs, simplifies processing, increases efficiency, and avoids the use of noxious chemical agents. Of particular importance is that binderless expandable microspheres are capable of fusing to one another, to fibrous material in a composite mixture, or a combination of both. The term "fusible" generally means able to fuse together into a connected mass comprising a fibrous material.

Expandable microspheres (which can comprise, for example, volatile physical blowing agents such as hydrocarbons or halocarbons encapsulated in thermoplastic shells) can be used in the methods and compositions of the invention. Expandable microspheres are available from Akzo Nobel AB under the trademark EXPANCEL. The amount and type of expandable microsphere utilized may each be readily varied to obtain the desired degree of expansion (typically, from about 5% to about 150%, more typically from about 35% to about 70%).

Some types of microspheres require binding phases. For example, syntactic foams require a binder phase in order to promote adhesion between microspheres, i.e., to support and reinforce glass microspheres, giving greater strength for a given density. However, excessive rigidity may result in cracking, particularly under thermal shock and cycling. In addition, some binders contribute to increased foam density and are thus less desirable.

Production methods and compositions for microspheres made from various glass, metallic, or polymeric materials have been disclosed, patented, or used in the past; e.g., see U.S. Pat. Nos. 3,615,972, 3,838,998, 3,888,957, 3,933,955, 3,945,956, 4,049,604, 4,075,134, 4,133,854, 4,257,798, 4,303,603, 4,349,456, 4,661,137, 4,767,726, 4,782,097, 4,983,550, 5,069,702, 5,053,436, 5,077,241, and 5,225,123.

Although not strictly limited thereto, when present, the expandable polymeric bead content of the composite sheet is generally from greater than 0 wt % to about 10 wt %.

The mineral fiber-containing composite sheet described herein may be desirably formed into an article by a forming technique such as compression molding or thermoforming, using air or gas pressure as an assist, if desired. Such methods are well-known and described in the literature, e.g., see U.S. Pat. Nos. 6,923,494 and 5,601,679. Thermoforming methods and tools are also described in detail in DuBois and Pribble's "Plastics Mold Engineering Handbook", Fifth Edition, 1995, pages 468 to 498. Although not limited thereto, a low density mat thermoplastic composite is preferably used.

The skin layer of the moldable composite sheet material may generally be a thermoplastic material applied to the surface of the fiber-containing thermoplastic resin. The skin layer may be, without limitation, a film, non-woven scrim, veil, woven fabric or a combination thereof. The skin layer is desirably air permeable and can substantially stretch and spread with the fiber-containing composite sheet during thermoforming and/or molding operations. If desired, the skin layer may also be a film that contains perforations and possesses adhesive characteristics so that it provides good adhesion to a cover sheet material applied to the skin layer. Such perforated adhesive films may provide enhanced acoustical performance by absorbing, attenuating and reducing the amount of sound intensity transmitted across an article prepared from the moldable composite sheet material. While not being limited thereto, the improved sound absorption capabilities desirably exceed an NRC rating (noise reduction coefficient) of 0.5. In another aspect, one of the skin layers may be a film that contains a higher temperature barrier layer capable of maintaining the air barrier performance to restrict the flow of air through the composite sheet to improve sound transmission loss performance.

The moldable composite sheet material may also be useful in a variety of applications in which stringent performance characteristics must be met. For example, as described in Provisional Application Ser. No. 60/795,852, it is desirable that certain durability requirements be achieved for automotive interior parts. Of particular interest is the ability of moldable composite sheet materials to meet the requirement that the adhesion of a surface cover material to the composite sheet of the invention be greater than a minimum peel strength and not exhibit substrate delamination following exposure to specified temperature and humidity requirements (Holden Limited requirement I-IN 1311 substrate adhesion durability requirement, section 4, clauses 4.3 and 4.8 for type 4 classified parts).

Although not limited thereto, the invention is useful in the manufacture of automotive articles, such as a headliner, door module, instrument panel topper, front and/or rear pillar trim, a sunshade, a parcel shelf, or a package tray, in which the improved thermal adhesive characteristics provide advantages over other materials utilized for such applications.

It is to be understood that while the invention has been described in conjunction with the preferred specific embodiments thereof, that the foregoing description as well as the examples that follow are intended to illustrate and not limit the scope of the invention. Other aspects, advantages and modifications within the scope of the invention will be apparent to those skilled in the art to which the invention pertains.

All patents, patent applications, and publications mentioned herein are hereby incorporated by reference in their entireties.

EXPERIMENTAL

Porous composite sheets were manufactured using the wet-lay papermaking process (as described and referenced herein) containing finely dispersed filamentized chopped fibers having nominal diameters of approximately 16 microns and average chopped fiber lengths of 0.5 inch and polypropylene resin uniformly distributed through the thickness of the composite sheets. Representative inventive mineral fiber-filled sheets were prepared using basalt fibers having these dimensions. Comparative sample sheets containing glass fibers having the same fiber dimensions rather than mineral (basalt) fibers were also prepared.

The composite sheets were laminated using a pair of nip rollers, with a multilayer (copolyamide/polypropylene) adhesive film on one side and a barrier film on the other side comprising a polyethylene scrim and a nylon barrier film. An adhesive layer was used between the barrier layer and the fiber-filled composite sheet materials.

Sample specimens were evaluated for sag resistance, heat insulative characteristics, and flexural properties at various fiber loadings ranging from 45 to 55% by weight.

Example 1 and Comparative Example 1C

Sag Resistance Measurements

Composite sheet samples were prepared as described above containing nominal 0.5 inch length, 16 micron diameter basalt fibers (example 1) in polypropylene resin at a fiber loading content of 48 wt. %. Comparative sheet samples were also prepared as described above containing nominal 0.5 inch length, 16 micron diameter glass fibers (comparative example 1C) in polypropylene resin at a fiber loading content of 55 wt. %. The total gsm values for the basalt-filled and glass-filled sheets are approximately 900 gsm.

Sag resistance for the basalt-filled sheets and the comparative glass-filled sheets was evaluated for composite sheets exposed to the same processing conditions on a Modern thermoformer. Sheets cut to 1600 mm×2337 mm were used in which the sheet samples were loaded into a 4-sided clamp frame with the adhesive side facing down. Clamps parallel to the machine direction (MD) spanned the entire length of the sheet while, in the cross direction (CD), the sheet was clamped with a series of six clamps spanning 100 mm each. After clamping, the sheet was rotated through the inactive first heating station and onto the active second heating station where the sheet was heated with IR heat using ceramic elements. After specified time periods, the sheet was transferred out of the oven to the sheet load/unload station so that sag measurements could be obtained. Oven dwell times were 45 sec. for the basalt-filled sheet and 42 sec. for the glass-filled sheet so that the sheets were exposed to the same soak temperatures. The sheet temperature was monitored using an IR temperature detector while in the oven.

Sag measurements on the sheets were obtained prior to heating and after heating by measuring the sag from the bottom of the sheet (with respect to a constant reference plane) while the sheet was suspended in the clamp frame. The sag measurements, taken as the difference between the pre- and post-heating measurements, are summarized in Table 1.

TABLE 1

Sag Measurements for Basalt-Filled and Comparative Glass-Filled Sheets

| Sample Number | Sag (mm) | |
|---|---|---|
| | Basalt-filled sheet (example 1) | Glass-filled sheet (example 1C) |
| 1 | 108 | 162 |
| 2 | 105 | 132 |
| 3 | 105 | 133 |
| 4 | 105 | 140 |
| 5 | 105 | 148 |
| 6 | — | 140 |
| 7 | — | 143 |
| Average | 106 | 143 |

As shown above, the basalt-filled sheet samples sagged 26% less than the glass-filled samples on average, demonstrating that the basalt-filled inventive samples sagged significantly less that the glass-filled comparative examples, even though the basalt fiber content was less (48 wt. % compared with 55 wt. %).

Example 2 and Comparative Example 2C

Molding Temperatures and Soaking (Dwell) Times

Composite sheet samples were prepared as described above containing nominal 0.5 inch length, 16 micron diameter basalt fibers (example 2) in polypropylene resin at a fiber loading content of 48 wt. %. Comparative sheet samples were also prepared as described above containing nominal 0.5 inch length, 16 micron diameter glass fibers (comparative example 2C) in polypropylene resin at a fiber loading content of 55 wt. %. The total gsm values for the basalt-filled and glass-filled sheets were approximately 900 gsm.

As described in Examples 1 and 1C, sheets cut to 1600 mm×2337 mm were used in which the sheet samples were loaded into a 4-sided clamp frame with the adhesive side facing down. Clamps parallel to the machine direction (MD) spanned the entire length of the sheet while, in the cross direction (CD), the sheet was clamped with a series of six clamps spanning 100 mm each. After clamping, the sheet was rotated through the inactive first heating station and onto the active second heating station where the sheet was heated with IR heat using ceramic elements. The sheet temperature was monitored using an IR temperature detector while in the oven. The heat soak (dwell) time for the basalt-filled sheets was kept constant at 45 sec. while the dwell time for the glass-filled samples was varied to obtain molding temperature close to those measured for the basalt-filled sheets. Molding temperatures and oven soaking dwell times at that temperature are provided in Table 2.

TABLE 2

Molding Temperatures and Soaking (Dwell) Times

| Run Number | Basalt-filled sheet (example 2) | | Glass-filled sheet (example 2C) | |
|---|---|---|---|---|
| | Molding Temp. (deg. F.) | Dwell Time (sec.) | Molding Temp. (deg. F.) | Dwell Time (sec.) |
| 1 | 419 | 45 | 435 | 45 |
| 2 | 421 | 45 | 415 | 39 |
| 3 | 421 | 45 | 418 | 40 |
| 4 | 420 | 45 | 419 | 42 |
| 5 | 423 | 45 | 427 | 42 |
| 6 | — | 45 | 425 | 42 |
| 7 | — | 45 | 425 | 42 |
| Average | 421 | 45 | 423 | 42 |

Comparison of the foregoing measurements generally shows that the basalt-filled sheets require longer heating times, i.e., these samples heat more slowly and have greater heat insulative characteristics than the comparative glass-filled sheets.

Example 3 and Comparative Example 3C

Flexural Properties

Composite sheet samples were prepared as described above containing nominal 0.5 inch length, 16 micron diameter basalt fibers (example 3) in polypropylene resin at a fiber loading content of 48 wt. %. Comparative sheet samples were also prepared as described above containing nominal 0.5 inch length, −16 micron diameter glass fibers (comparative example 3C) in polypropylene resin at a fiber loading content of 55 wt. %. The total gsm values for the basalt-filled and glass-filled sheets were approximately 900 gsm.

Flexural testing was performed according to a Honda Motor Co. test procedure to determine the flexural peak load and slope (modulus) by subjecting samples to a three-point bending test. Specimen size was 50 mm×150 mm with both longitudinal (MD) and transverse (TD) specimens obtained from the basalt-filled sheet materials and the comparative glass-filled sheets. Specimen thickness was nominally 2.9-3.0 mm. The specimens were supported for loading by placing them on rounded supports spaced 100 mm apart and were loaded at a constant crosshead speed of 50 mm/min at the centerpoint of the specimen. The stress/strain data were recorded as the load was applied, along with the peak load at break. The modulus was determined as the slope from the linear portion of the stress/strain curve in a conventional manner.

Flexural data obtained for both basalt-filled sheets and comparative glass-filled sheets are provided in Table 3 and in FIG. 1. In general, the flexural properties measured for the basalt-filled materials were at least similar to the comparative glass-filled materials; for certain measurements, the basalt-filled materials demonstrated significant improvements in the flexural properties as compared to the comparative glass-filled materials (e.g., the flexural modulus for longitudinal direction specimens).

TABLE 3

Flexural Properties of Basalt-Filled Composite Sheets (example 3) and Comparative Glass-Filled Sheets (example 3C)

| Parameter | Core Basis Wt (gsm)[1] | | Thickness (mm)[2] | | Peak Load (N) | | | | Flexural Strength (MPa) | | | | | |
|---|---|---|---|---|---|---|---|---|---|---|---|---|---|---|
| | | | | | MD | | TD | | MD | | TD | | MD/TD | |
| | Glass | Basalt | Glass | Basalt | Glass | Basalt | Glass | Basalt | Glass | Basalt | Glass | Basalt | Glass | Basalt |
| Average | 800 | 792 | (3.0)[3] | 2.89 | 15.6 | 19.4 | 14.0 | 13.7 | 5.31 | 7.03 | 4.80 | 5.16 | 1.11 | 1.40 |
| Std. Dev. | — | 41 | — | 0.07 | 2.9 | 2.0 | 2.6 | 2.1 | 1.06 | 0.92 | 0.93 | 1.17 | 0.15 | 0.33 |
| 95% CI | — | 40 | — | 0.07 | 1.2 | 2.0 | 1.1 | 2.0 | 0.43 | 0.91 | 0.38 | 1.14 | 0.06 | 0.32 |

| | Flexural Modulus (MPa) | | | | | | Slope (N/cm) | | | |
|---|---|---|---|---|---|---|---|---|---|---|
| | MD | | TD | | MD/TD | | MD | | TD | |
| Parameter | Glass | Basalt | Glass | Basalt | Glass | Basalt | Glass | Basalt | Glass | Basalt |
| Average | 651 | 972 | 523 | 525 | 1.26 | 1.91 | 33.8 | 47.5 | 26.8 | 25.3 |
| Std. Dev. | 167 | 207 | 113 | 109 | 0.26 | 0.52 | 7.3 | 13.0 | 4.7 | 4.5 |
| 95% CI | 68 | 202 | 46 | 107 | 0.11 | 0.51 | 3.0 | 12.8 | 1.9 | 4.4 |

[1]Actual core basis weght (gsm)
[2]Thickness as molded (mm)
[3]Approximate thickness (mm)

Example 4 and Comparative Example 4C

Sag Resistance and Lofted Thickness Measurements

Additional experiments were conducted on larger size inventive and comparative sheet materials to evaluate the temperature response, sag resistance and lofted thickness characteristics. For the purposes of the comparison, the comparative sheet materials were glass-filled and the inventive sheets were basalt-filled. Composite sheet samples were prepared as described above containing nominal 0.5 inch length, 16 micron diameter basalt fibers (example 4) in polypropylene resin at a fiber loading content of 48 wt % and 55 wt. %. Comparative sheet samples were also prepared as described above containing nominal 0.5 inch length, 16 micron diameter glass fibers (comparative example 4C) in polypropylene resin, also at fiber loading contents of 48 and 55 wt. %. The total gsm values for the basalt-filled and glass-filled sheets were approximately 900 gsm.

Sheet materials were processed on a thermoformer equipped with two sets of clamp frames, a double acting press and an infra-red (IR) oven. Oven temperatures were adjusted to provide sheet sample temperatures of 180° C. and 200° C. in order to evaluate the sag resistance and lofted thickness characteristics of the sheet materials.

All sheets were loaded into a 4-sided clamp frame with a vacuum automated loader. The sheet orientation in the clamps was adhesive side down. One set of clamps spanned the entire machine direction of the sheet and the other set of clamps spanned the majority of the cross-machine direction of the sheet. After clamping, the sheet was conveyed into the oven. Once the sheet entered the oven, the bottom heating elements were actuated upward and remained approximately two feet from the sheet line position; the sheet was then heated with IR heat using ceramic elements. The sheet was transferred out of the oven based on a measured heat soak time. The sheet top (Frim) surface temp was monitored with a pyrometer located in the center of the oven. The oven was also equipped with a sensor located in the bottom of the oven to detect an excessive sag condition and stop the line should one occur. At the end of the heat soak time, the clamp frames were extended and pulled some of the sag out of the sheet. The sheet was then transferred to the press and formed with a covering material. After forming, the sheet was conveyed out of the press and transported by an operator to a water-jet trim station.

Four sheet materials containing basalt fibers (inventive example 4 having ID's of 12a, 12b, 13a, and 13b) and one sheet containing glass fibers (comparative example 4C having an ID of VO) were evaluated, as shown in Table 4.

TABLE 4

Sheet Material Characteristics

| Example | ID | Sample | Fiber | Fiber % | Basis Wt (gsm) | Surface layer 1 | Surface layer 2 |
|---|---|---|---|---|---|---|---|
| 4 | 12a | 3-302 | Basalt | 48 | 900 | 40 gsm perforated | 62 gsm barrier scrim |
| 4 | 12b | 3-303 | Basalt | 48 | 900 | 60 gsm perforated | 62 gsm barrier scrim |
| 4 | 13a | 3-305 | Basalt | 55 | 900 | 40 gsm perforated | 62 gsm barrier scrim |
| 4 | 13b | 3-304 | Basalt | 55 | 900 | 60 gsm perforated | 62 gsm barrier scrim |
| 4C | VO | — | Glass | 55 | 900 | 40 gsm perforated | 76 gsm barrier film |

Temperature sensitive tape was placed on the test specimen samples to "dial-in" the target sheet temperatures (180° C. and 200° C.) in preparation for the sag measurements. Each specimen was prepared for sheet sag and lofted thickness measurement by heating it to the "target" temperature and then transferring it to a resting position above the form tool where it was allowed to cool for 60 seconds. After cooling, the sheet was removed from the clamp frame and a small section was cut from the center of the sheet and measured for lofted thickness. The sheet was then placed on the floor and the sheet sag was measured with a tape/scale through the hole that had been previously cut.

The product process temperature readings from the oven control panel were also recorded for each specimen heated for the sheet sag and lofted thickness measurements. The temperature record for each sheet is shown in Table 5 along with the sag and lofted thickness results.

TABLE 5

Sag and Lofted Thickness Measurements

| Example | ID | Sample | Target Temp (° C.) | Oven Display (° C.) | Sag (mm) | Lofted Thickness (mm) |
|---|---|---|---|---|---|---|
| 4C | V0 | — | 180 | 187 | 100 | 6 |
| 4 | 12a (1) | 3-302 | 180 | 187 | 145 | 5.7 |
| 4 | 12a (2) | 3-302 | 180 | 186 | — | — |
| 4 | 12b (1) | 3-303 | 180 | 184 | 135 | 5.8 |
| 4 | 12b (2) | 3-303 | 180 | 185 | 135 | 6.0 |
| 4 | 13a (1) | 3-305 | 180 | 190 | 155 | 7.3 |
| 4 | 13a (2) | 3-305 | 180 | 190 | 140 | 7.4 |
| 4 | 13b (1) | 3-304 | 180 | 189 | 150 | 7.0 |
| 4 | 13b (2) | 3-304 | 180 | 187 | 140 | 7.3 |
| 4C | V0 | — | 200 | 210 | 155 | 7.0 |
| 4 | 12a | 3-302 | 200 | 209 | 150 | 6.0 |
| 4 | 12b | 3-303 | 200 | 206 | 150 | 6.0 |
| 4 | 13a | 3-305 | 200 | 214 | — | — |
| 4 | 13b | 3-304 | 200 | 213 | 155 | 8.0 |

From the above results, a few general conclusions may be noted. For example, the level of mineral fiber (basalt) appears to have relatively little impact on the sag measurements, as shown by comparison of the 48 and 55 wt. % fiber loaded samples. In fact, the 55% basalt fiber loaded sample has a larger sag measurement (146 mm average at 180° C. target) than the 48% basalt fiber loaded samples (138 mm average at 180° C. target). In addition, the basalt-filled materials demonstrate relatively little change in the sag measurement compared to the glass-filled materials as the targeted (heating) temperature is increased by 20° C. from 180° C. to 200° C. (i.e., a 7% increase in sag measurement is observed for the basalt-filled samples at 200° C. compared to 180° C., whereas, a 55% increase in the sag measurement is demonstrated for the glass-filled samples over the same temperature range).

What is claimed is:

1. A method of producing a porous moldable thermoplastic composite sheet article comprising:
   adding chopped, discontinuous reinforcing basalt fibers and a polypropylene resin to an agitated liquid-containing foam to form a dispersed mixture of the polypropylene resin and the chopped, discontinuous reinforcing basalt fibers;
   depositing the dispersed mixture of the chopped, discontinuous reinforcing basalt fibers and the polypropylene resin onto a forming support element;
   evacuating the liquid from the deposited dispersed mixture to form a web from the chopped, discontinuous reinforcing basalt fibers and the polypropylene resin;
   heating the web above a softening temperature of the polypropylene resin of the web;
   compressing the web to a predetermined thickness to form a porous thermoplastic core sheet material comprising the web formed from the chopped, discontinuous reinforcing basalt fibers and the polypropylene resin, wherein the polypropylene resin is uniformly dispersed throughout a thickness of the porous thermoplastic core sheet material; and
   disposing a perforated film on a first surface of the porous thermoplastic core sheet material; and
   disposing a barrier layer on a second surface of the porous thermoplastic core sheet material to form a porous moldable thermoplastic composite sheet article, wherein the chopped basalt fibers are present in the porous thermoplastic core sheet material from about 45 weight percent to about 55 weight percent, and wherein the formed porous moldable thermoplastic composite sheet article comprises a lower sag, a higher peak load value in the machine direction, a higher flexural strength value in the machine direction, a higher flexural modulus in the machine direction and a higher flexural slope in the machine direction when compared to a reference composite article that is substantially the same as the porous moldable thermoplastic composite sheet article except having glass fibers in place of the basalt fibers.

2. The method of claim 1, further comprising configuring the thermoplastic core sheet material to comprise additional fibers and configuring a length of the additional fibers to be about 7 mm to about 50 mm with a diameter not less than 7 microns.

3. The method of claim 1, further comprising configuring the thermoplastic core sheet material to comprise additional fibers.

4. The method of claim 3, further comprising selecting the additional fibers to comprise at least one of glass fibers, carbon fibers, synthetic organic fibers and natural fibers.

5. The method of claim 1, further comprising configuring the porous thermoplastic core sheet material to comprise an areal density between 400 g/m² and 4000 g/m2.

6. The method of claim 1, wherein the perforated film disposed on the first surface comprises a multilayer adhesive film.

7. The method of claim 6, wherein the barrier layer comprises a scrim.

8. The method of claim 7, further comprising molding the porous moldable thermoplastic composite sheet article into a vehicle headliner.

9. The method of claim 7, further comprising molding the porous moldable thermoplastic composite sheet article into rear pillar automotive trim.

10. The method of claim 1, wherein the perforated film is a copolyamide/polypropylene film laminated to the first surface of the porous moldable thermoplastic core sheet material.

11. The method of claim 10, wherein the barrier layer comprises a polyethylene scrim and a nylon barrier film laminated to the second surface of the porous moldable thermoplastic core sheet material.

12. The method of claim 11, wherein the chopped, discontinuous basalt fibers comprise a nominal length of about 0.5 inches and a nominal diameter of about 16 microns, and wherein the basalt fiber loading is 48 weight percent.

13. The method of claim 12, wherein the porous thermoplastic composite sheet article comprises an average peak load of 19.4 N in the machine direction, an average flexural strength of 7.03 MPa in the machine direction, an average flexural modulus of 972 MPa in the machine direction and an average flexural slope of 47.5 N/cm in the machine direction as measured using a 3-point being test.

14. The method of claim 13, wherein the porous thermoplastic composite sheet article comprises an average peak load of 13.7 N in the transverse direction, an average flexural strength of 5.16 MPa in the transverse direction, an average flexural modulus of 525 MPa in the transverse direction and an average flexural slope of 25.3 N/cm in the transverse direction as measured using a 3-point being test.

15. A method of producing a porous moldable thermoplastic composite sheet article comprising:

adding chopped, discontinuous reinforcing basalt fibers and a polypropylene resin to an agitated liquid-containing foam to form a dispersed mixture of the polypropylene resin and the chopped, discontinuous reinforcing basalt fibers;

depositing the dispersed mixture of the chopped, discontinuous reinforcing basalt fibers and the polypropylene resin onto a forming support element;

evacuating the liquid from the deposited dispersed mixture to form a web from the chopped, discontinuous reinforcing basalt fibers and the polypropylene resin;

heating the web above a softening temperature of the polypropylene resin of the web;

compressing the web to a predetermined thickness to form a porous thermoplastic core sheet material comprising the web formed from the chopped, discontinuous reinforcing basalt fibers and the polypropylene resin, wherein the polypropylene resin is uniformly dispersed throughout a thickness of the porous thermoplastic core sheet material; and disposing a perforated film on a first surface of the porous thermoplastic core sheet material; and disposing a barrier layer on a second surface of the porous thermoplastic core sheet material to form a porous moldable thermoplastic composite sheet article, wherein the chopped basalt fibers are present in the porous thermoplastic core sheet material from about 45 weight percent to about 55 weight percent, and wherein the formed porous moldable thermoplastic composite sheet article comprises a lower sag, a higher peak load value in the machine direction, a higher flexural strength value in the machine direction, a higher flexural modulus in the machine direction and a higher flexural slope in the machine direction when compared to a reference composite article that is substantially the same as the porous moldable thermoplastic composite sheet article except having glass fibers in place of the basalt fibers, wherein the chopped, discontinuous reinforcing basalt fibers comprise a nominal length of 0.5 inches and a diameter of 16 microns, wherein the chopped, discontinuous reinforcing basalt fibers are present at 48% by weight, wherein a basis weight of the porous moldable thermoplastic composite sheet article is 900 gsm, and wherein the porous moldable thermoplastic composite sheet article comprises a sag of 106 mm, as measured in a clamp frame with respect to a constant reference plane, after infrared heating in an oven for 45 seconds.

16. The method of claim 1, wherein the discontinuous reinforcing basalt fibers comprise a nominal length of 0.5 inches and a diameter of 16 microns, wherein the thermoplastic resin is polypropylene resin, wherein the discontinuous reinforcing basalt fibers are present at 48% by weight, wherein a basis weight of the thermoplastic composite article is 792 gsm, and wherein the thermoplastic composite article comprises a peak load in a machine direction of 19.4 N, a peak load in a transverse direction of 7.03 N, a flexural strength in the machine direction of 7.03 MPa, a flexural strength in the transverse direction of 5.16 MPa, a flexural modulus in the machine direction of 972 MPa, a flexural modulus in the transverse direction of 525, a flexural slope in the machine direction of 47.5 N/cm, and a flexural slope in the transverse direction of 25.3 N/cm.

17. A method of producing a porous moldable thermoplastic composite sheet article comprising:

adding chopped, discontinuous reinforcing basalt fibers and a polypropylene resin to an agitated liquid-containing foam to form a dispersed mixture of the polypropylene resin and the chopped, discontinuous reinforcing basalt fibers;

depositing the dispersed mixture of the chopped, discontinuous reinforcing basalt fibers and the polypropylene resin onto a forming support element;

evacuating the liquid from the deposited dispersed mixture to form a web from the chopped, discontinuous reinforcing basalt fibers and the polypropylene resin;

heating the web above a softening temperature of the polypropylene resin of the web;

compressing the web to a predetermined thickness to form a porous thermoplastic core sheet material comprising the web formed from the chopped, discontinuous reinforcing basalt fibers and the polypropylene resin, wherein the polypropylene resin is uniformly dispersed throughout a thickness of the porous thermoplastic core sheet material; and disposing a perforated film on a first surface of the porous thermoplastic core sheet material; and disposing a barrier layer on a second surface of the porous thermoplastic core sheet material to form a porous moldable thermoplastic composite sheet article, wherein the chopped basalt fibers are present in the porous thermoplastic core sheet material from about 45 weight percent to about 55 weight percent, and wherein the formed porous moldable thermoplastic composite sheet article comprises a lower sag, a higher peak load value in the machine direction, a higher flexural strength value in the machine direction, a higher flexural modulus in the machine direction and a higher flexural slope in the machine direction when compared to a reference composite article that is substantially the same as the porous moldable thermoplastic composite sheet article except having glass fibers in place of the basalt fibers, wherein the film on the first surface comprises a 40 gsm perforated film or a 60 gsm perforated film, the barrier layer on the second surface comprises a 62 gsm barrier scrim, a basis weight of the porous moldable thermoplastic composite sheet article is 900 gsm, and wherein the chopped, discontinuous reinforcing basalt fibers are present at 48% by weight or 55% by weight.

* * * * *